Jan. 20, 1970

C. H. COLLETT 3,490,526

INTEGRAL GUIDE FOR SUCKER RODS

Filed Jan. 30, 1968

INVENTOR.
Charles H. Collett
BY
Attorney

United States Patent Office 3,490,526
Patented Jan. 20, 1970

3,490,526
INTEGRAL GUIDE FOR SUCKER RODS
Charles H. Collett, Box 411, Menlo Park, Calif. 94025
Filed Jan. 30, 1968, Ser. No. 701,641
Int. Cl. E21b *37/02;* F16c *1/26*
U.S. Cl. 166—176                    1 Claim

ABSTRACT OF THE DISCLOSURE

A novel configuration and construction of a guide used in combination with a sucker rod employed in pumping oil wells. The guides are made of oil resisting rubber or other elastomeric material and are molded directly upon the rod itself so as to form an integral part thereof. The guides themselves are employed in pairs along the length of the rod and are of an unusual configuration which comprises essentially a segment of a circle in cross-section tapered at the ends and alternate guides are positioned diametrically opposite to each other. This permits uninterrupted flow of the oil around the guides while preserving their inherent strength and stability on the rod.

BACKGROUND OF THE INVENTION

In the pumping of oil wells it is necessary to operate pumps at a considerable depth below the surface of the earth. These depths may sometimes be as much as 6,000 to 8,000 feet and the pressures and stresses encountered are obviously proportionate. To connect the pumping mechanism located on the earth's surface with the pump located a great distance below, slender rods are used. These are formed in sections which are coupled together by variously constructed couplings and may vary in length, a typical length ranging from 25 to 32 feet. In the construction of an oil well it is virtually impossible to make the borehole perfectly vertical and a considerable amount of crookedness must be contended with. For this reason the rods must be made relatively slender and flexible and some means must be provided to guide them in the tube to prevent excessive friction and binding.

For the latter purpose various types of guides and guiding devices have been constructed. These have generally consisted of some type of sleeves or bushings made of some oil resisting material and fastened to the rod at desired intervals. The fastening has heretofore been accomplished by various clamping and fastening devices which have generally relied on spring tension or screw pressure to provide the necessary frictional contact between the guide and the rod and prevent its movement on the rod when the pump is in operation.

The latter has presented a very troublesome problem because of the tremendous pressures encountered. This is further aggravated by the fact that the guides must be of such configuration as to provide an opening or clearance space, usually in the form of grooves, holes, or flutes in the guide itself to permit the oil to flow through.

These problems are especially encountered on the down stroke of the pump. The slender rods must, of necessity, be equipped with enlarged cross-sections at each end to facilitate coupling them together. Whenever a guide works loose from the rod, as often happens with existing guides, it works itself upward on the rod during the down stroke of the pump and soon lodges itself against the enlarged cross-sectional end of the rod which causes it to expand, jam in the borehole, and render the well inoperative. The attendant expense and loss of time in restoring normal operation is evident to those skilled in the art. Moreover, any relative movement between the rod and the guide which makes the latter change its position destroys its value as a guide and renews the problem of buckling, binding, and friction of the rod against the borehole.

SUMMARY OF THE INVENTION

It is therefore a principal object of my invention to provide a guide for sucker rods used in oil well pumping which would be practically free from the danger of coming loose and moving relative to the rod.

It is another object of my invention to provide a rod guide which while being practically immovable, would permit ready flow of the oil between the guide and the tube of the borehole.

It is yet another object of my invention to provide a rod guide which while having the above advantages, could be readily applied to the rod in the field.

It is a general object of my invention to provide a guide and rod combination having such construction and configuration that it would eliminate the problems encountered with existing rods and guides, as set forth above.

I have discovered that I am able to mold a guide directly on the rod itself in the field. For this porpose I may employ an oil resisting rubber or other elastomeric material and apply it directly around and against the rod by using a portable molding machine. In this manner I have discovered further that I am able to employ a solid guide, free from any springs or clamps which might come loose. I am further able to employ a configuration of my guide having a cross-section which is the general shape of a segment of a circle. The outer circumference of the segment bears upon the inside of the borehole tube while the rest of the circular space is left open for the flow of oil. By employing pairs of guides which are staggered 180 degrees apart, I am able to provide satisfactory bearing against the interior of the borehole tube around its entire circumference while providing adequately for the flow of oil past the guide, and yet employing a guide of solid construction.

DESCRIPTION OF THE PREFERRED EMBODIMENTS

Figure 4:
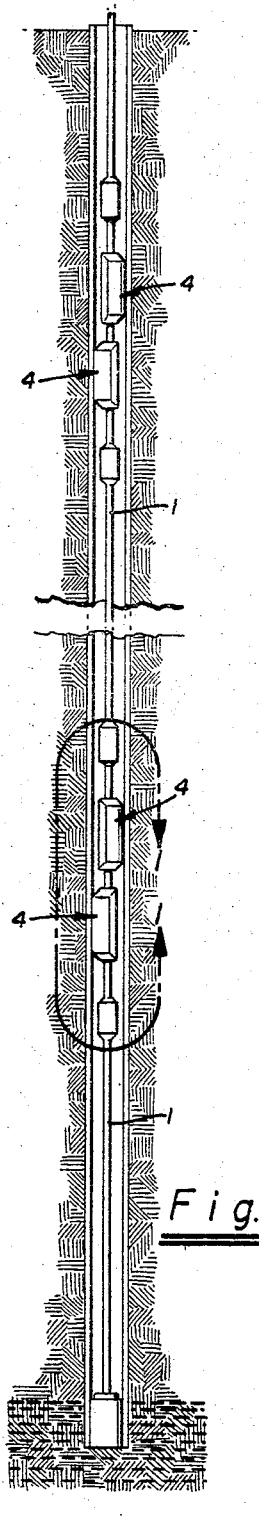
FIG. 4 is a schematic longitudinal section through a well showing the relation of my guides to a borehole tube.

Referring now to the drawing, there is seen first a typical sucker rod 1. This comprises a long, slender central section which may have a diameter D of approximately 1 inch. The overall length of the rod may vary but a typical length L may range from 25 to 32 feet. At either end of rod 1 there is a section which is enlarged to a larger diameter 2 upon which there may be a thread 3. This section is constructed so as to facilitate the coupling of successive rods together. The latter may be effected by various means, depending upon the construction of the coupling mechanism which is used, but in every case it necessitates a diameter which is somewhat larger than the diameter D of the rod itself.

Figure 1:
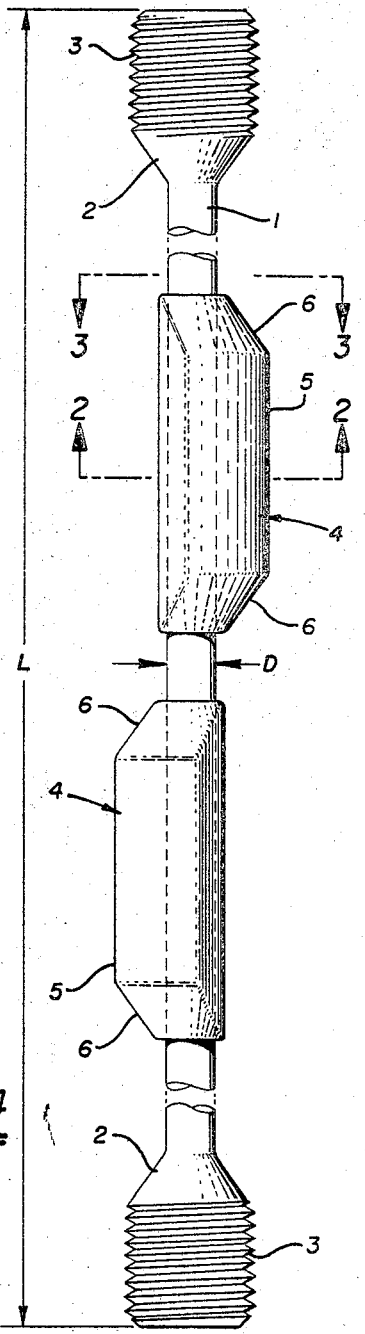
FIG. 1 is a partial longitudinal view showing a pair of guides of my invention applied to a typical rod.

Positioned on the rod 1 are my rod guides 4, one pair of which is shown in FIG. 1. These may be of the order of magnitude of five inches in overall length and each pair may be spaced approximately one inch apart. The number of pairs of guides which are used in any one particular rod length may vary with the application. In most cases a single pair located at the center of one rod length will suffice. Where greater crookedness is encountered, more guides may be used and it is sometimes desirable to utilize additional guides close to the pump to relieve the latter of the effects of misalignment inherent in the rod, as set forth above. This is illustrated on FIG. 4.

Figure 3:
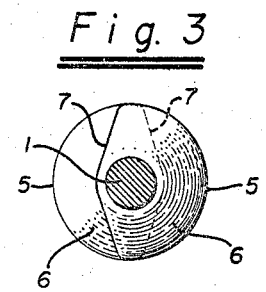
FIG. 3 is a section along line 3—3 of FIG. 1.
Figure 2:
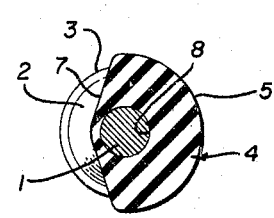
FIG. 2 is a section along line 2—2 of FIG. 1.

The guides themselves have a circular section 5 which actually comprises a segment of a circle only. This may have a radius of the order of magnitude of 1⅛ inches, depending on the diameter of the borehole tube, but in each case the diameter of this section should be greater than the diameter of the enlarged section 2 of the rod. The guides themselves also have a longitudinally tapered section 6 and a radially cutaway section 7. These are employed to provide a sufficient flow area for the oil past the guides when the pump is in operation, as discussed above. I may use any convenient angle for these tapered and cutaway sections, but have found that an angle of approximately 37 degrees to the longitudinal axis of the rod is satisfactory for tapered section 6 and an angle of approximately 20 degrees to the horizontal axis of the rod is satisfactory for cutaway section 7. The effect of this construction upon the flow of oil through the tube may be best visualized by reference to FIG. 3. This figure also shows best the effect of utilizing a pair of my guides spaced 180 degrees apart with reference to the center of the rod, thus providing a virtually 360 degrees or better guide contact with the interior circumference of the tube.

An important feature of this type of construction is that it enables me to mold my guides directly onto the rod, utilizing the solid construction of my invention. This I accomplish by utilizing a portable molding machine such as those used for field molding and vulcanizing of rubber and similar materials, known to those skilled in the art. I position my molding machine around the rod at the desired location of the guide and fill the mold with the elastomeric material which I choose to use. As set forth above, this may either be an oil resisting rubber or neoprene or any other similar material. The guide is then molded upon the rod by the application of heat to the machine in the form of electrical resistance or steam, as is also well known to those skilled in the art. The inner circumferential surface 8 of my guide then forms an extremely tight bond to the outside diameter D of the rod and thus is not subject to shaking or jarring loose, as is the case with existing devices. The geometry employed, moreover, permits ready flow of oil past the guides as set forth above without employing any openings, such as holes, passageways, or flutes, in the guide which tend to weaken it and render impossible the use of a solid construction.

I am also able to use my invention in connection with shorter rods known as "pony" rods to those skilled in the art. These are very short sections of rod utilized to properly space the longer rods with relation to the pump. In this case I mold my guides onto the rods in the plant or factory rather than in the field. The principle, however, of my invention, remains the same as disclosed above.

Other advantages of my novel construction will now become evident to those skilled in art.

While I have shown a preferred embodiment of my invention, I do not limit myself to the specific embodiment herein disclosed, except as I do so in the claim that follows.

I claim:
1. In an oil well bore tube and pumping equipment the combination comprising:
  a sucker rod;
  a first guide of elastomeric material molded around said rod;
  a second guide of elastomeric material molded around said rod in spaced relation to said first guide along the longitudinal axis of said rod;
  the cross-section of each of said guides having a geometry which comprises a segment of a circle connecting with two equal, intersecting straight sides;
  the central angle of said segment having an angle greater than 180 degrees;
  the straight sides forming an angle with each other of less than 180 degrees;
  the outer surfaces of said guides being disposed for sliding contact with the inner surface of said oil well bore tube;
  said rod being free to deflect laterally along its length in a direction opposite to said outside surfaces of said guides within the area occupied by said guides;
  tapered sections at the longitudinal ends of each of said guides;
  said guides being further positioned so that the said segments of said circles defined by said cross-sections lie on diametrically opposite sides of the longitudinal axis of said rod.

References Cited

UNITED STATES PATENTS

| | | | |
|---|---|---|---|
| 1,672,850 | 6/1928 | Meir et al. | 308—4 |
| 2,248,894 | 7/1941 | Park | 308—4 |
| 2,286,716 | 6/1942 | Clark | 308—4 |
| 2,863,704 | 12/1958 | Hillman | 166—176 X |
| 3,186,773 | 6/1965 | Harris et al. | 308—4 |

DAVID H. BROWN, Primary Examiner

U.S. Cl. X.R.

308—4